United States Patent [19]
Crook

[11] Patent Number: 6,105,932
[45] Date of Patent: Aug. 22, 2000

[54] RADIATOR SHUT OFF VALVE

[76] Inventor: Peter Crook, 28 Burgess Road, Sutton, Surrey, London SM1 1RW, United Kingdom

[21] Appl. No.: 09/176,841

[22] Filed: Oct. 22, 1998

[51] Int. Cl.[7] .................................................... F16L 29/00
[52] U.S. Cl. ............................................................ 251/152
[58] Field of Search ........................... 251/315.01, 315.1, 251/152

[56] References Cited

U.S. PATENT DOCUMENTS

| 3,760,836 | 9/1973 | Albanese | 251/315.01 |
| 4,418,887 | 12/1983 | Tubaro | 251/152 |
| 5,647,398 | 7/1997 | Giesler | 251/359 |

*Primary Examiner*—Kevin Shaver
*Assistant Examiner*—Eric Keasel

[57] ABSTRACT

A radiator valve for preventing water from leaking out of a radiator when the radiator is detached from its hot water supply. The radiator valve includes a tubular housing with a lumen and opposite first and second ends. A ball valve is rotatably mounted in the lumen of the tubular housing to substantially block passage of fluid through the lumen of the tubular housing. The first end of the tubular housing is designed for attachment to a fluid opening of a radiator to fluidly connect the lumen of the tubular housing to the fluid housing of the radiator. The second end of the tubular housing is designed for removable attachment to a fluid supply outlet of a fluid supply conduit to fluidly connect the lumen of the housing to the fluid supply conduit.

11 Claims, 3 Drawing Sheets

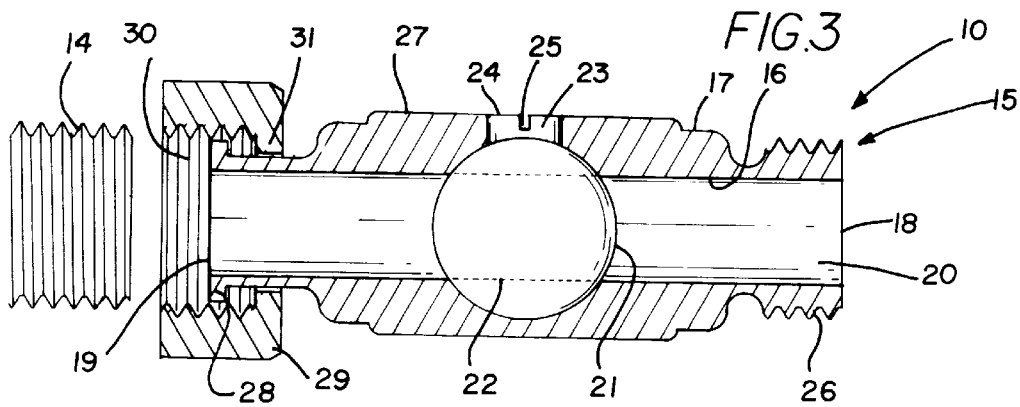
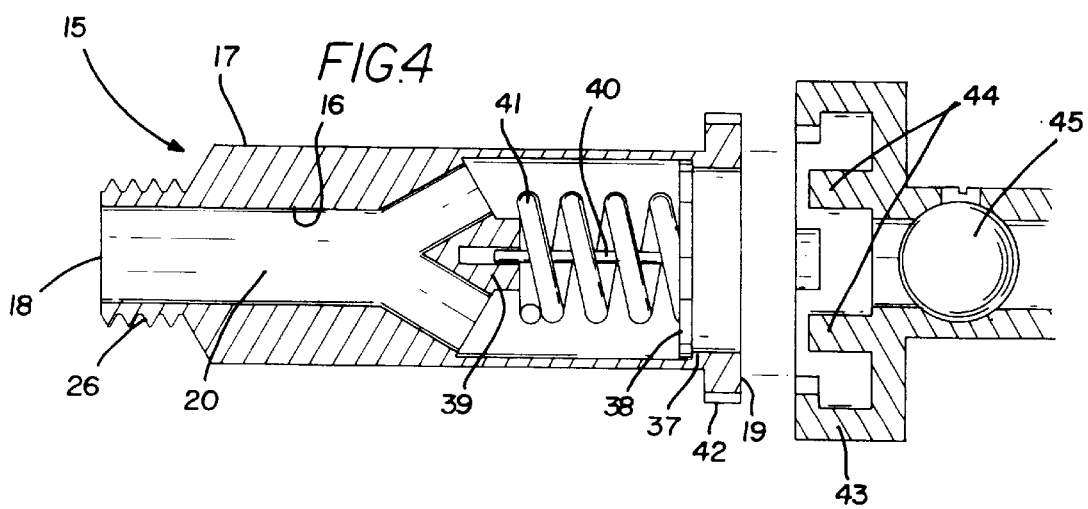

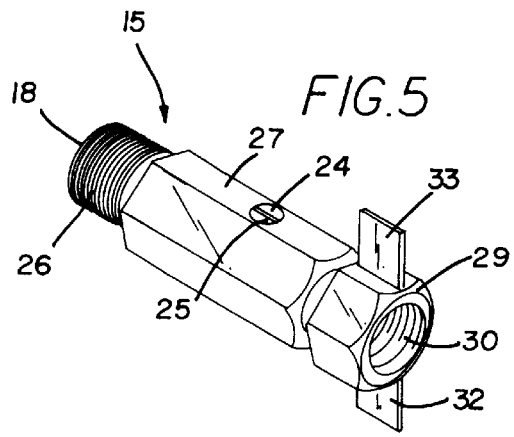
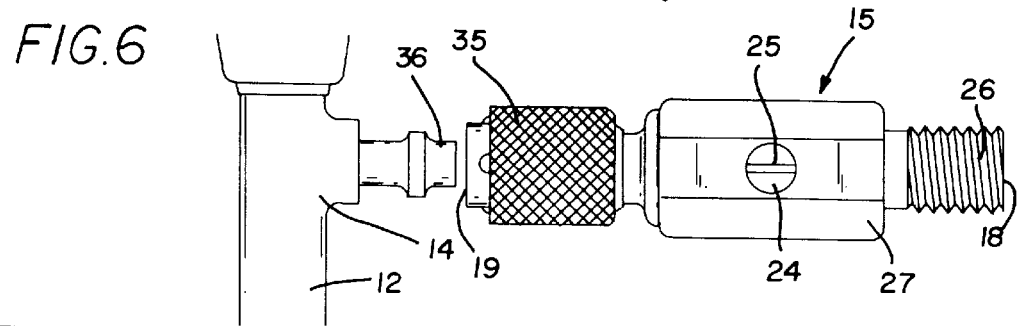
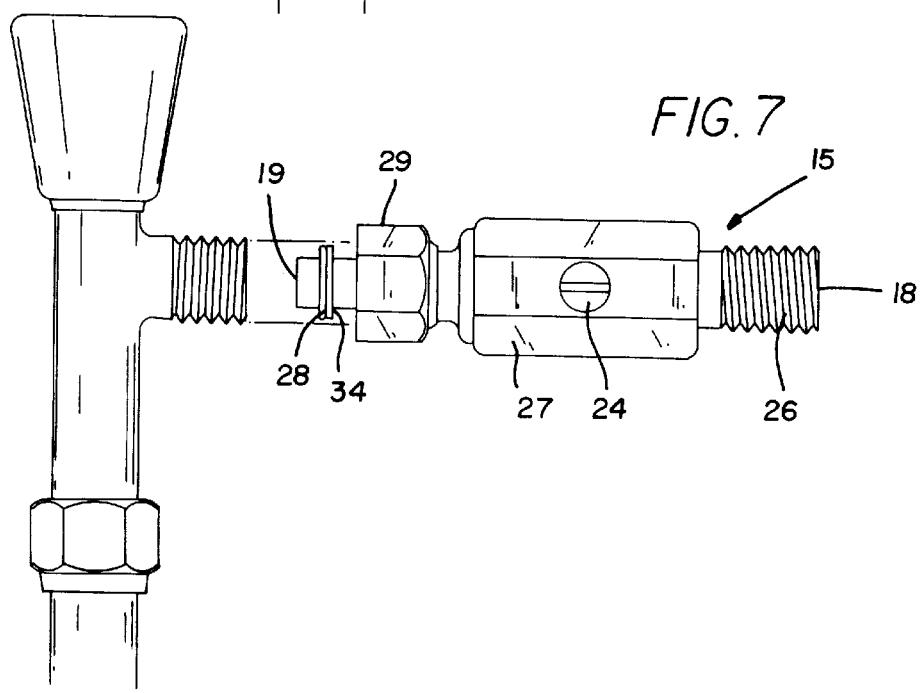

RADIATOR SHUT OFF VALVE

BACKGROUND OF THE INVENTION

1. Field of the Invention

The present invention relates to devices for preventing water from leaking out of a radiator when the radiator is detached from its hot water supply and more particularly pertains to a new radiator valve for preventing water from leaking out of a radiator when the radiator is detached from its hot water supply.

2. Description of the Prior Art

The use of devices for preventing water from leaking out of a radiator when the radiator is detached from its hot water supply is known in the prior art. More specifically, devices for preventing water from leaking out of a radiator when the radiator is detached from its hot water supply heretofore devised and utilized are known basically of familiar, expected and obvious structural configurations, notwithstanding the myriad of designs encompassed by the crowded prior art which have been developed for the fulfillment of countless objectives and requirements.

Known prior art includes U.S. Pat. No. 1,767,391; U.S. Pat. No. 4,905,965; U.S. Pat. No. 4,611,786; U.S. Pat. No. Des. 314,234; U.S. Pat. No. 2,411,057; and U.S. Pat. No. 4,148,459.

While these devices fulfill their respective, particular objectives and requirements, the aforementioned patents do not disclose a new radiator valve. The inventive device includes a tubular housing with a lumen and opposite first and second ends. A ball valve is rotatably mounted in the lumen of the tubular housing to substantially block passage of fluid through the lumen of the tubular housing. The first end of the tubular housing is designed for attachment to a fluid opening of a radiator to fluidly connect the lumen of the tubular housing to the fluid housing of the radiator. The second end of the tubular housing is designed for removable attachment to a fluid supply outlet of a fluid supply conduit to fluidly connect the lumen of the housing to the fluid supply conduit.

In these respects, the radiator valve according to the present invention substantially departs from the conventional concepts and designs of the prior art, and in so doing provides an apparatus primarily developed for the purpose of preventing water from leaking out of a radiator when the radiator is detached from its hot water supply.

SUMMARY OF THE INVENTION

In view of the foregoing disadvantages inherent in the known types of devices for preventing water from leaking out of a radiator when the radiator is detached from its hot water supply now present in the prior art, the present invention provides a new radiator valve construction wherein the same can be utilized for preventing water from leaking out of a radiator when the radiator is detached from its hot water supply.

The general purpose of the present invention, which will be described subsequently in greater detail, is to provide a new radiator valve apparatus and method which has many of the advantages of the devices for preventing water from leaking out of a radiator when the radiator is detached from its hot water supply mentioned heretofore and many novel features that result in a new radiator valve which is not anticipated, rendered obvious, suggested, or even implied by any of the prior art devices for preventing water from leaking out of a radiator when the radiator is detached from its hot water supply, either alone or in any combination thereof.

To attain this, the present invention generally comprises a tubular housing with a lumen and opposite first and second ends. A ball valve is rotatably mounted in the lumen of the tubular housing to substantially block passage of fluid through the lumen of the tubular housing. The first end of the tubular housing is designed for attachment to a fluid opening of a radiator to fluidly connect the lumen of the tubular housing to the fluid housing of the radiator. The second end of the tubular housing is designed for removable attachment to a fluid supply outlet of a fluid supply conduit to fluidly connect the lumen of the housing to the fluid supply conduit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new radiator valve apparatus and method which has many of the advantages of the devices for preventing water from leaking out of a radiator when the radiator is detached from its hot water supply mentioned heretofore and many novel features that result in a new radiator valve which is not anticipated, rendered obvious, suggested, or even implied by any of the prior art devices for preventing water from leaking out of a radiator when the radiator is detached from its hot water supply, either alone or in any combination thereof.

It is another object of the present invention to provide a new radiator valve which may be easily and efficiently manufactured and marketed.

It is a further object of the present invention to provide a new radiator valve which is of a durable and reliable construction.

An even further object of the present invention is to provide a new radiator valve which is susceptible of a low cost of manufacture with regard to both materials and labor, and which accordingly is then susceptible of low prices of sale to the consuming public, thereby making such radiator valve economically available to the buying public.

Still yet another object of the present invention is to provide a new radiator valve which provides in the apparatuses and methods of the prior art some of the advantages thereof, while simultaneously overcoming some of the disadvantages normally associated therewith.

Still another object of the present invention is to provide a new radiator valve for preventing water from leaking out of a radiator when the radiator is detached from its hot water supply.

Yet another object of the present invention is to provide a new radiator valve which includes a tubular housing with a lumen and opposite first and second ends. A ball valve is rotatably mounted in the lumen of the tubular housing to substantially block passage of fluid through the lumen of the tubular housing. The first end of the tubular housing is designed for attachment to a fluid opening of a radiator to fluidly connect the lumen of the tubular housing to the fluid housing of the radiator. The second end of the tubular housing is designed for removable attachment to a fluid supply outlet of a fluid supply conduit to fluidly connect the lumen of the housing to the fluid supply conduit.

Still yet another object of the present invention is to provide a new radiator valve that lets a user avoid having to drain a radiator before detaching it from its hot water supply. This lets the user quickly remove the radiator for repairs or replacement.

Even still another object of the present invention is to provide a new radiator valve that prevents water from dripping out of a radiator when detached from its hot water supply.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic cross sectional view of the present invention taken from line 3—3 of FIG. 2.

FIG. 4 is a schematic cross sectional view of a preferred optional embodiment of the present invention.

FIG. 5 is a schematic perspective view of the present invention with the retaining nut with turning wings.

FIG. 6 is a schematic side view of a quick-release embodiment of the present invention.

FIG. 7 is a schematic side view of the present invention with an extended second end and an annular gasket.

DESCRIPTION OF THE PREFERRED EMBODIMENT

Figure 1:
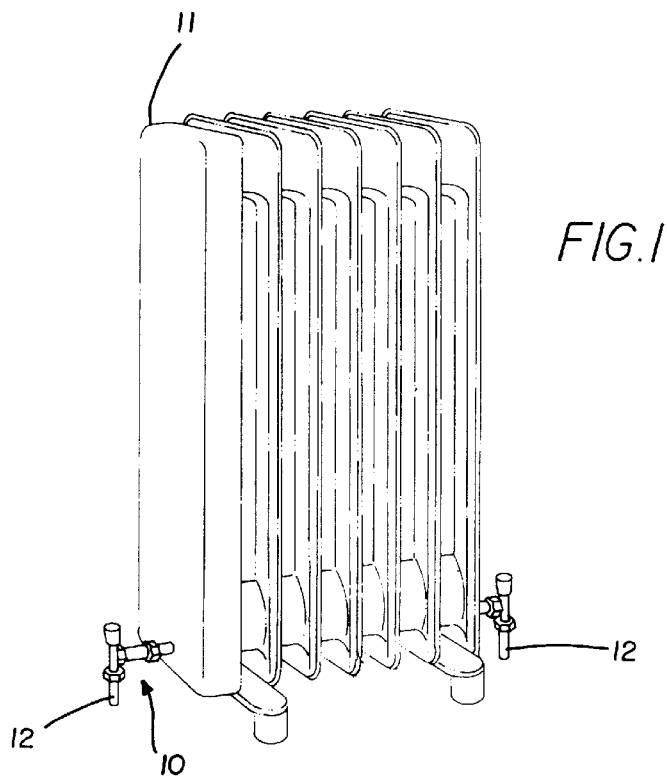
FIG. 1 is a schematic perspective view of a new radiator valve in use on a radiator according to the present invention.
Figure 2:
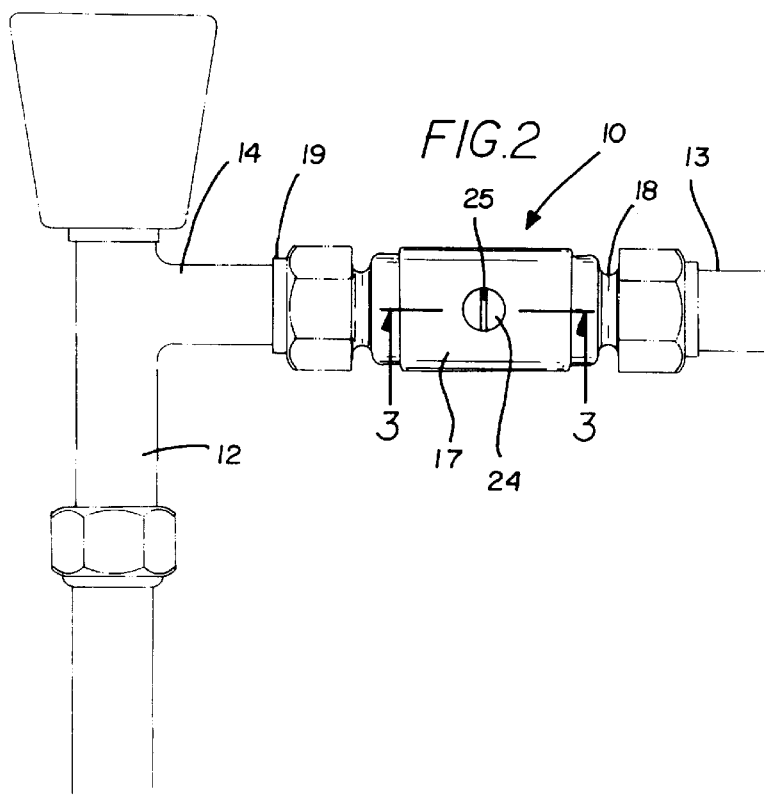
FIG. 2 is a schematic enlarged side view of the present invention.

With reference now to the drawings, and in particular to FIGS. 1 through 7 thereof, a new radiator valve embodying the principles and concepts of the present invention and generally designated by the reference numeral 10 will be described.

As best illustrated in FIGS. 1 through 7, the radiator valve 10 generally comprises a tubular housing 15 with a lumen 20 and opposite first and second ends 18,19. A ball valve 21 is rotatably mounted in the lumen 20 of the tubular housing 15 to substantially block passage of fluid through the lumen 20 of the tubular housing 15. The first end 18 of the tubular housing 15 is designed for attachment to a fluid opening 13 of a radiator 11 to fluidly connect the lumen 20 of the tubular housing 15 to the fluid housing of the radiator 11. The second end 19 of the tubular housing 15 is designed for removable attachment to a fluid supply outlet 14 of a fluid supply conduit 12 to fluidly connect the lumen 20 of the housing to the fluid supply conduit 12.

In closer detail, the valve system is designed for a radiator 11 connected to at least one fluid supply conduit 12. The radiator 11 has a fluid opening 13 therein. The fluid supply conduit 12 has a fluid supply outlet 14 in fluid communication with the fluid opening 13 of the radiator 11. The valve system comprises a tubular housing 15 with inner and outer surfaces 16,17, opposite first and second ends 18,19, and a longitudinal axis extending between the first and second ends 18,19 of the tubular housing 15. The inner surface 16 of the housing defines a lumen 20 of the tubular housing 15 with the first and second ends 18,19 of the tubular housing 15 each having an opening into the lumen 20 of the housing.

The tubular housing 15 has a length defined between the first and second ends 18,19 of the tubular housing 15. In an ideal illustrative embodiment, the length of the tubular housing 15 is about 10 cm. In this ideal illustrative embodiment, the outer surface 17 of the tubular housing 15 defines a width of about 2 cm.

Preferably, the lumen 20 of the tubular housing 15 is generally cylindrical and has a diameter and an axis coaxial with the longitudinal axis of the tubular housing 15. The openings of the first and second ends 18,19 of the tubular housing 15 each preferably have a generally circular transverse cross section substantially perpendicular to the longitudinal axis of the housing.

A generally spherical ball valve 21 is rotatably mounted in the lumen 20 of the tubular housing 15. The ball valve 21 is positioned between the first and second ends 18,19 of the tubular housing 15. The ball valve 21 substantially blocks passage of fluid through the lumen 20 of the tubular housing 15. The ball valve 21 has an axial bore 22 therethrough. The axial bore 22 of the ball valve is generally cylindrical and has an axis. The axis of the axial bore 22 of the ball valve 21 and the longitudinal axis of the tubular housing 15 generally lie in a common plane with one other. Preferably, the axial bore 22 has a diameter about equal to the diameter of the lumen 20 of the tubular housing 15. In use, the ball valve 21 is rotatable in the lumen 20 of the tubular housing 15 between an open position and a closed position. The axial bore 22 of the ball valve 21 is generally coaxial with the axis of the lumen 20 of the tubular housing 15 when the ball valve 21 is positioned in the open position to permit passage of fluid in the lumen 20 of the tubular housing 15 through the axial bore 22 of the ball valve 21. When the ball valve 21 is positioned in the closed position, the axial bore 22 of the ball valve 21 is extended generally perpendicular with the axis of the lumen 20 of the tubular housing 15 to block passage of fluid in the lumen 20 of the tubular housing 15 through the ball valve 21.

The ball valve 21 has an outwardly extending generally cylindrical extent 23 extending through a lateral hole in the tubular housing 15 between the inner and outer surfaces 16,17 of the tubular housing 15. The extent 23 of the ball valve 21 has an axis extending substantially perpendicular to the axis of the axial bore 22 of the ball valve 21. The axis of the extent 23 is extended substantially perpendicular to the longitudinal axis of the tubular housing 15. The extent 23 of the ball valve 21 has an outer face 24 preferably generally flush with the outer surface 17 of the tubular housing 15. The outer face 24 of the extent 23 has a slot 25 therein extending across the diameter of the outer face 24 of the extent 23. In use, the slot 25 of the outer face 24 of the extent 23 is designed for receiving a tip of a screwdriver therein to permit rotating of the ball valve 21 between the open and closed positions by the turning of the extent 23 of the ball valve 21 with the screwdriver. The extent 23 of the ball valve 21 preferably has a diameter between about one-fourth and three-fourths the diameter of the ball valve 21. Ideally, the diameter of the extent 23 is less than about one-half the diameter of the ball valve 21 to help reduce the risk of fluid in the lumen 20 from leaking out between the extent 23 and the tubular housing 15.

The first end 18 of the tubular housing 15 is designed for attachment to a fluid opening 13 of a radiator 11 to fluidly connect the lumen 20 of the tubular housing 15 to the fluid housing of the radiator 11. With reference to FIG. 3, preferably, the outer surface 17 of the housing has a threaded region 26 at around the first end 18 of the tubular housing 15. The threaded region 26 of the first end 18 of the tubular housing 15 is designed for threadably coupling the first end 18 of the tubular housing 15 to a fluid opening 13 of a radiator 11.

Preferably, the outer surface 17 of the tubular housing 15 has a hexagonal portion 27 has a generally hexagonal transverse cross section substantially perpendicular to the longitudinal axis of the tubular housing 15. In use, the hexagonal portion 27 of tubular portion is designed for aiding holding the jaws of a wrench on the outer surface 17 of the housing when attaching and removing the tubular housing 15 from the fluid opening 13 of a radiator 11.

The second end 19 of the tubular housing 15 is designed for removable attachment to a fluid supply outlet 14 of a fluid supply conduit 12 to fluidly connect the lumen 20 of the housing to the fluid supply conduit 12. As illustrated in FIG. 3, in a preferred embodiment, the second end 19 of the tubular housing 15 has an outwardly radiating annular flange 28 therearound. The annular flange 28 of the second end 19 preferably lies in a plane generally perpendicular to the longitudinal axis of the tubular housing 15.

A ring-shaped retaining nut 29 is provided with a threaded interior 30. The second end 19 of the tubular housing 15 is inserted into the threaded interior 30 of the retaining nut 29 to permit free rotation of said retaining nut 29 around the second end 19 of the tubular housing 15 about the longitudinal axis of the tubular housing 15. The retaining nut 29 has an inwardly radiating flange 31 disposed around the outer surface 17 of the tubular housing 15 between the first and second ends 18,19 of the tubular housing 15. The annular flange 28 of the second end 19 of the tubular housing 15 has an outer diameter greater than an inner diameter of the inwardly radiating flange 31 of the retaining nut 29 such that retaining nut 29 may not be removed from the second end 19 of the tubular housing 15.

In use, the threaded interior 30 of the retaining nut 29 is designed for threadably receiving a threaded portion of the fluid supply outlet 14 of a fluid supply conduit 12 to fluidly connect the second end 19 of the tubular housing 15 to the fluid supply outlet 14 of the fluid supply conduit 12. Optionally, the retaining nut 29 has a pair of outwardly extending wings 32,33 designed for aiding rotation of the retaining nut 29 about the second end 19 of the tubular housing 15. Ideally, as illustrated in FIG. 7, the second end 19 of the tubular housing 15 has a resilient compressible annular gasket 34 disposed therearound adjacent the annular flange 28 of the second end 19. In use, the annular gasket 34 is designed for helping to insure a water-tight seal between the annular flange 28 of the second end 19 and the inwardly radiating flange 31 of the retaining nut 29.

Optionally, the second end 19 of the tubular housing 15 may have instead a quick release sleeve 35 rotatably mounted thereto designed for connecting to a male quick release 36 connector fluid supply outlet 14 of a fluid supply conduit 12.

In another optional preferred embodiment as illustrated in FIG. 4, the lumen 20 of the tubular housing 15 has an inwardly radiating annular shoulder 37 adjacent the second end 19 of the tubular housing 15. A closure disk 38 is provided in the lumen 20 of the tubular housing 15 and abuts the annular shoulder 37 of the lumen 20 to substantially block passage of fluid through the lumen 20 of the tubular housing 15. The tubular housing 15 has a stop portion 39 extending into lumen 20 of the tubular housing 15. The stop portion 39 is positioned between the first end 18 of the tubular housing 15 and the closure disk 38. The closure disk 38 has a mounting shaft 40 slidably inserted into a hole in the stop portion 39 of the tubular housing 15 to permit movement of the closure disk 38 back and forth along the axis of the lumen 20 of the tubular housing 15. A coiled compression spring 41 is disposed around the shaft 40 and positioned between the stop portion 39 and the closure disk 38. The spring 41 biases the closure disk 38 against the annular shoulder 37 of the tubular housing 15.

In this optional preferred embodiment, the second end 19 of the tubular housing 15 has a outwardly radiating twist-lock flange 42 designed for insertion into a twist-lock coupler 43 of a fluid supply outlet 14 of a fluid supply conduit 12 to fluidly connect the second end 19 of the tubular housing 15 to the fluid supply outlet 14. The fluid supply outlet 14 has an annular push ring 44 which pushes the closure disk 38 away from the annular shoulder 37 to let fluid pass through the lumen 20 of the tubular housing 15. Ideally, in this embodiment, the fluid supply outlet 14 also has a ball valve 45 of similar construction as disclosed above to help insure no leaks from the fluid supply conduit line.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A valve system for a radiator connected to at least one fluid supply conduit, the radiator having a fluid opening therein, the fluid supply conduit having a fluid supply outlet in fluid communication with the fluid opening of the radiator, the valve system comprising:

a tubular housing having inner and outer surfaces, opposite first and second ends, and a longitudinal axis extending between said first and second ends of said tubular housing;

said inner surface of said housing defining a lumen of said tubular housing, said first and second ends of said tubular housing each having an opening into said lumen of said housing;

said tubular housing having a length defined between said first and second ends of said tubular housing, wherein said length of said tubular housing is about 10 centimeters;

wherein said outer surface of said tubular housing is generally cylindrical and has a diameter, wherein said diameter of said outer surface is about 2 centimeters;

wherein said lumen of said tubular housing is generally cylindrical and has an axis coaxial with said longitudinal axis of said tubular housing, said lumen of said tubular housing having a diameter;

said openings of said first and second ends of said tubular housing each having a generally circular transverse cross section substantially perpendicular to said longitudinal axis of said housing;

a generally spherical ball valve being rotatably mounted in said lumen of said tubular housing, said ball valve being positioned between said first and second ends of said tubular housing, said ball valve substantially blocking passage of fluid through said lumen of said tubular housing;

said ball valve having an axial bore therethrough, said axial bore of said ball valve being generally cylindrical and having an axis, said axis of said axial bore of said ball valve and said longitudinal axis of said tubular housing generally lying in a common plane with one other;

said axial bore having a diameter about equal to said diameter of said lumen of said tubular housing such that said axial bore of said ball valve maintains a constant pressure throughout said lumen of said tubular housing;

said ball valve being rotatable in said lumen of said tubular housing between an open position and a closed position;

said axial bore of said ball valve being generally coaxial with said axis of said lumen of said tubular housing when said ball valve is positioned in said open position to permit passage of fluid in said lumen of said tubular housing through said axial bore of said ball valve;

said axial bore of said ball valve being extended generally perpendicular with said axis of said lumen of said tubular housing when said ball valve is positioned in said closed position to block passage of fluid in said lumen of said tubular housing through said ball valve;

said ball valve having an outwardly extending generally cylindrical extent extending through said tubular housing between said inner and outer surfaces of said tubular housing;

said extent of said ball valve having an axis extending substantially perpendicular to said axis of said axial bore of said ball valve;

said axis of said extent being extended substantially perpendicular to said longitudinal axis of said tubular housing;

said extent of said ball valve having an outer face, said outer face of said extent being generally flush with said outer surface of said tubular housing;

said outer face of said extent having a slot therein extending across the diameter of said outer face of said extent, said slot of said outer face of said extent being adapted for receiving a tip of a screwdriver therein to permit rotating of said ball valve between said open and closed positions by the turning of the extent of the ball valve with the screwdriver;

said extent of said ball valve having a diameter between about one-fourth and three-fourths said diameter of said ball valve, wherein said diameter of said extent is less then about one-half said diameter of said ball valve to help reduce the risk of fluid in said lumen from leaking out between said extent and said tubular housing;

said first end of said tubular housing being adapted for attachment to a fluid opening of a radiator to fluidly connect said lumen of said tubular housing to the fluid opening of the radiator;

said outer surface of said housing having a threaded region at said first end of said tubular housing, said threaded region of said first end of said tubular housing being adapted for threadably coupling said first end of said tubular housing to the fluid opening of the radiator;

said outer surface of said tubular housing having a hexagonal portion having a generally hexagonal transverse cross section substantially perpendicular to said longitudinal axis of said tubular housing, said hexagonal portion of said tubular portion being adapted for aiding the jaws of a wrench on said outer surface of said tubular housing when attaching and removing said tubular housing from the fluid opening of the radiator;

said second end of said tubular housing being adapted for removable attachment to the fluid supply outlet of a fluid supply conduit to fluidly connect said lumen of said housing to the fluid supply conduit;

said second end of said tubular housing having an outwardly radiating annular flange therearound, said annular flange of said second end lying in a plane generally perpendicular to said longitudinal axis of said tubular housing;

a ring-shaped retaining nut having a threaded interior, said second end of said tubular housing being inserted into said threaded interior of said retaining nut to permit free rotation of said retaining nut around said second end of said tubular housing about said longitudinal axis of said tubular housing;

said retaining nut having an inwardly radiating flange disposed around said outer surface of said tubular housing between said first and second ends of said tubular housing;

said annular flange of said second end of said tubular housing having an outer diameter greater than an inner diameter of said inwardly radiating flange of said retaining nut such that said retaining nut may not be removed from said second end of said tubular housing;

said threaded interior of said retaining nut being adapted for threadably receiving a threaded portion of the fluid supply outlet of the fluid supply conduit of the radiator to fluidly connect said second end of said tubular housing to the fluid supply outlet of the fluid supply conduit;

said retaining nut having a pair of outwardly extending wings adapted for aiding rotation of said retaining nut about said second end of said tubular housing; and said second end of said tubular housing having a resilient compressible annular gasket disposed therearound adjacent said annular flange of said second end said annular gasket being adapted for helping to insure a water-tight seal between said annular flange of said second end and said inwardly radiating flange of said retaining nut.

2. A valve system for a radiator, the valve system comprising:

a tubular housing having inner and outer surfaces, opposite first and second ends, and a longitudinal axis extending between said first and second ends of said tubular housing;

said inner surface of said housing defining a lumen of said tubular housing, said first and second ends of said tubular housing each having an opening into said lumen of said housing;

said lumen of said tubular housing having an axis;

a ball valve being rotatably mounted in said lumen of said tubular housing, said ball valve substantially blocking passage of fluid through said lumen of said tubular housing;

said ball valve having an axial bore therethrough, said axial bore of said ball valve having an axis, said axis of said axial bore of said ball valve and said longitudinal axis of said tubular housing generally lying in a common plane with one other, said axial bore having a diameter about equal to a diameter of said lumen of said tubular housing such that said axial bore of said ball valve maintains a constant pressure throughout said lumen of said tubular housing;

said first end of said tubular housing being adapted for attachment to a fluid opening of the radiator to fluidly connect said lumen of said tubular housing to the fluid opening of the radiator; and said second end of said tubular housing being adapted for removable attachment to a fluid supply outlet of a fluid supply conduit of the radiator to fluidly connect said lumen of said housing to the fluid supply conduit.

3. The valve system of claim 2, wherein said axis of said lumen of said tubular housing is generally coaxial with said longitudinal axis of said tubular housing.

4. The valve system of claim 2, wherein said ball valve is rotatable in said lumen of said tubular housing between an open position and a closed position, said axial bore of said ball valve being generally coaxial with said axis of said lumen of said tubular housing when said ball valve is positioned in said open position to permit passage of fluid in said lumen of said tubular housing through said axial bore of said ball valve, said axial bore of said ball valve being extended generally perpendicular with said axis of said lumen of said tubular housing when said ball valve is positioned in said closed position to block passage of fluid in said lumen of said tubular housing through said ball valve.

5. The valve system of claim 2, wherein said ball valve has an outwardly extending generally cylindrical extent extending through said tubular housing between said inner and outer surfaces of said tubular housing, said extent of said ball valve having an axis extending substantially perpendicular to said axis of said axial bore of said ball valve, an outer face of said extent having a slot therein, said slot of said outer face of said extent being adapted for receiving a tip of a screwdriver therein.

6. The valve system of claim 5, wherein said outer face of said extent is generally flush with said outer surface of said tubular housing.

7. The valve system of claim 2, wherein said outer surface of said housing has a threaded region at said first end of said tubular housing, said threaded region of said first end of said tubular housing being adapted for threadably coupling said first end of said tubular housing to the fluid opening of the radiator.

8. The valve system of claim 2, wherein said outer surface of said tubular housing has a hexagonal portion having a generally hexagonal transverse cross section substantially perpendicular to said longitudinal axis of said tubular housing.

9. The valve system of claim 2, wherein said second end of said tubular housing has an outwardly radiating annular flange therearound, said annular flange of said second end lying in a plane generally perpendicular to said longitudinal axis of said tubular housing, and further comprising a ring-shaped retaining nut having a threaded interior, said second end of said tubular housing being inserted into said threaded interior of said retaining nut to permit free rotation of said retaining nut around said second end of said tubular housing about said longitudinal axis of said tubular housing, said threaded interior of said retaining nut being adapted for threadably receiving a threaded portion of the fluid supply outlet of the fluid supply conduit to fluidly connect said second end of said tubular housing to the fluid supply outlet of the fluid supply conduit.

10. The valve system of claim 9, wherein said retaining nut has an inwardly radiating flange disposed around said outer surface of said tubular housing between said first and second ends of said tubular housing.

11. The valve system of claim 9, wherein said retaining nut has a pair of outwardly extending wings.

* * * * *